(12) United States Patent
Xing et al.

(10) Patent No.: US 11,228,930 B2
(45) Date of Patent: Jan. 18, 2022

(54) METHOD, DEVICE AND APPARATUS FOR SELECTING USER SIGNATURE VECTOR, AND STORAGE MEDIUM

(71) Applicant: CHINA ACADEMY OF TELECOMMUNICATIONS TECHNOLOGY, Beijing (CN)

(72) Inventors: Yanping Xing, Beijing (CN); Shanzhi Chen, Beijing (CN); Shaoli Kang, Beijing (CN); Bin Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 163 days.

(21) Appl. No.: 16/319,789

(22) PCT Filed: Jul. 12, 2017

(86) PCT No.: PCT/CN2017/092567
§ 371 (c)(1),
(2) Date: Jan. 22, 2019

(87) PCT Pub. No.: WO2018/014763
PCT Pub. Date: Jan. 25, 2018

(65) Prior Publication Data
US 2019/0174345 A1 Jun. 6, 2019

(30) Foreign Application Priority Data
Jul. 22, 2016 (CN) .......................... 201610586198.5

(51) Int. Cl.
*H04W 24/10* (2009.01)
*H04W 72/12* (2009.01)
(Continued)

(52) U.S. Cl.
CPC .......... *H04W 24/10* (2013.01); *H04B 17/336* (2015.01); *H04L 1/0001* (2013.01);
(Continued)

(58) Field of Classification Search
None
See application file for complete search history.

(56) References Cited

U.S. PATENT DOCUMENTS

2012/0214538 A1* 8/2012 Kim ...................... H04W 52/50
455/522
2015/0271755 A1* 9/2015 Karri ................. H04W 28/0221
370/252
(Continued)

FOREIGN PATENT DOCUMENTS

CN 104980247 A 10/2015
CN 104980389 A 10/2015

OTHER PUBLICATIONS

First Office Action, The State Intellectual Property Office of People's Republic of China, China Academy of Telecommunications Technology, Title of Invention: Method and Device for Selection of User Signature Vectors, Publication dated Oct. 14, 2015.
(Continued)

*Primary Examiner* — Hassan A Phillips
*Assistant Examiner* — Gautam Sharma
(74) *Attorney, Agent, or Firm* — Harness, Dickey & Pierce, P.L.C.

(57) ABSTRACT

A method, a device and an apparatus for selecting a user signature vector, and a storage medium are provided. The method includes: acquiring a measurement result of an actual channel state of a terminal; determining a measurement result interval to which the measurement result belongs, based on the measurement result and a preset measurement threshold; determining a candidate user signature vector set corresponding to the measurement result interval to which the measurement result belongs, based on a preset correspondence between measurement result intervals and user signature vector sets, where the candidate user signature vector set includes one or more user signature
(Continued)

vectors; and selecting the user signature vector from the candidate user signature vector set.

20 Claims, 3 Drawing Sheets

(51) Int. Cl.
*H04L 1/00* (2006.01)
*H04B 17/336* (2015.01)
*H04L 25/03* (2006.01)
*H04L 12/26* (2006.01)
*H04W 52/24* (2009.01)

(52) U.S. Cl.
CPC ...... *H04L 1/0071* (2013.01); *H04L 25/03898* (2013.01); *H04L 43/16* (2013.01); *H04W 52/242* (2013.01); *H04W 72/12* (2013.01)

(56) References Cited

U.S. PATENT DOCUMENTS

| 2015/0288483 | A1 | 10/2015 | Sun et al. | |
|---|---|---|---|---|
| 2016/0119807 | A1 | 4/2016 | Sun et al. | |
| 2016/0366687 | A1* | 12/2016 | Guo | H04L 5/0053 |
| 2017/0019160 | A1* | 1/2017 | Giannakis | H04B 7/0413 |
| 2017/0251430 | A1* | 8/2017 | Fazel Sarjoui | H04W 76/27 |
| 2018/0205506 | A1* | 7/2018 | Ren | H04L 5/0007 |

OTHER PUBLICATIONS

First Office Action, The State Intellectual Property Office of People's Republic of China, China Academy of Telecommunications Technology, Title of Invention: Method and Device for Selection of User Signature Vectors, Publication dated Oct. 14, 2015, Document Number or Title: CN104980247 A.

\* cited by examiner

METHOD, DEVICE AND APPARATUS FOR SELECTING USER SIGNATURE VECTOR, AND STORAGE MEDIUM

CROSS-REFERENCE TO RELATED APPLICATION

This application is the U.S. national phase of PCT Application No. PCT/CN2017/092567 filed on Jul. 12, 2017, which claims a priority to Chinese Patent Application No. 201610586198.5 filed on Jul. 22, 2016, the disclosures of which are incorporated in their entirety by reference herein.

TECHNICAL FIELD

The present disclosure relates to the field of communication technology, and in particular to a method, a device and an apparatus for selecting a user signature vector, and a storage medium.

BACKGROUND

From the first generation to the fourth generation of mobile telecommunication technology, conventional multiple access techniques in mobile telecommunication are mainly based on orthogonal multiple access, such as frequency division multiple access (FDMA), time division multiple access (TDMA), code division multiple access (CDMA), orthogonal frequency division multiple access (OFDMA) and space division multiple access (SDMA), to share radio resources. Orthogonal and synchronous FDMA technique is utilized in 4G, and users occupy different time-frequency resource blocks.

Considering from multi-user information theory, orthogonal approaches can only reach an internal bound of a multi-user capacity bound; while based on the multi-user information theory, a higher multi-user system capacity can be achieved by applying non-orthogonal multiple access transmission techniques than applying the orthogonal approaches. Therefore, the non-orthogonal multiple access techniques have potential advantages in terms of improving spectrum efficiency.

In current researches of 3rd Generation Partnership Project New Radio (3GPP NR), various non-orthogonal multiple access techniques are proposed, including: non-orthogonal multiple access techniques based on code domain, such as Pattern Division Multiple Access (PDMA), Sparse Code Multiple Access (SCMA), and Multi-User Shared Access (MUSA); interleaver-based non-orthogonal multiple access techniques, such as Interleave Division Multiple Access (IDMA), and Interleave-Grid Multiple Access (IGMA); and non-orthogonal multiple access techniques based on power domain.

Furthermore, grant-free non-orthogonal uplink transmission, i.e., resources used by a terminal in uplink transmission not being scheduled and notified by a network side, is researched in researches of NR. In a currently-proposed solution for grant-free non-orthogonal uplink transmission, a terminal selects a user signature vector randomly and spreads an information bit to one or more resources based on the selected user signature vector. Depending on different non-orthogonal multiple access solutions, the signature vector may be generated through spreading and/or multidimensional constellation modulation and/or an interleaving pattern and/or a power distribution factor.

In a scenario of applying non-orthogonal multiple access transmission in grant-free transmission, when a terminal selects a user signature vector randomly, the selected user signature vector cannot match an actual channel state of the current terminal.

SUMMARY

In view of the above issue, a method and a device for selecting a user signature vector are provided according to embodiments of the present disclosure, to address the issue in the related technology that a randomly selected user signature vector cannot match an actual channel state of a current terminal.

In a first aspect, a method for selecting a user signature vector is provided, including: acquiring a measurement result of an actual channel state of a terminal; determining, based on the measurement result and a preset measurement threshold, a measurement result interval to which the measurement result belongs; determining, based on a preset correspondence between measurement result intervals and user signature vector sets, a candidate user signature vector set corresponding to the measurement result interval to which the measurement result belongs, where the candidate user signature vector set includes one or more user signature vectors; and selecting the user signature vector from the candidate user signature vector set.

Optionally, the method further includes spreading an information bit to one or more resources based on the selected user signature vector.

Optionally, the user signature vector is generated through one or any combination of spreading, multidimensional constellation modulation, an interleaving pattern or a power distribution factor.

Optionally, the preset measurement threshold is notified by a network side.

Optionally, the preset correspondence between the measurement result intervals and the user signature vector sets is determined in a protocol or notified by a network side.

Optionally, in a case that different user signature vectors have different diversities, a user signature vector having a high diversity corresponds to an interval for a poor measurement result.

Optionally, a quantity of non-zero elements in a spreading sequence is defined as the diversity.

Optionally, selecting the user signature vector from the candidate user signature vector set includes: selecting one user signature vector randomly for each data flow or determining the user signature vector for each data flow based on a terminal identifier (ID) and a preset rule, in a case that there are multiple user signature vectors in the candidate user signature vector set.

Optionally, the measurement result is acquired through any of path loss measurement, downlink signal receiving power measurement, downlink signal receiving quality measurement, downlink channel state measurement, signal-to-noise ratio measurement or signal-to-interference-plus-noise ratio measurement; in a case of utilizing path loss measurement, the greater a measurement value is, the worse the measurement result is; and in a case of utilizing downlink signal receiving power measurement, downlink signal receiving quality measurement, downlink channel state measurement, signal-to-noise ratio measurement or signal-to-interference-plus-noise ratio measurement, the smaller a measurement value is, the worse the measurement result is.

In a second aspect, a device for selecting a user signature vector is provided, including: an acquiring module, configured to acquire a measurement result of an actual channel state of a terminal; a first determining module, configured to determine, based on the measurement result and a preset measurement threshold, a measurement result interval to which the measurement result belongs; a second determining module, configured to determine, based on a preset correspondence between measurement result intervals and user signature vector sets, a candidate user signature vector set corresponding to the measurement result interval to which the measurement result belongs, where the candidate user signature vector set includes one or more user signature vectors; and a selecting module, configured to select the user signature vector from the candidate user signature vector set.

Optionally, the device further includes a spreading module, configured to spread an information bit to one or more resources based on the selected user signature vector.

Optionally, the user signature vector is generated through one or any combination of spreading, multidimensional constellation modulation, an interleaving pattern or a power distribution factor.

Optionally, the preset measurement threshold is notified by a network side.

Optionally, the preset correspondence between the measurement result intervals and the user signature vector sets is determined in a protocol or notified by a network side.

Optionally, in a case that different user signature vectors have different diversities, a user signature vector having a high diversity corresponds to an interval for a poor measurement result.

Optionally, a quantity of non-zero elements in a spreading sequence is defined as the diversity.

Optionally, the selecting module is further configured to select one user signature vector randomly for each data flow or determine the user signature vector for each data flow based on a terminal identifier (ID) and a preset rule, in a case that there are multiple user signature vectors in the candidate user signature vector set.

Optionally, the measurement result is acquired through any of path loss measurement, downlink signal receiving power measurement, downlink signal receiving quality measurement, downlink channel state measurement, signal-to-noise ratio measurement or signal-to-interference-plus-noise ratio measurement; in a case of utilizing path loss measurement, the greater a measurement value is, the worse the measurement result is; and in a case of utilizing downlink signal receiving power measurement, downlink signal receiving quality measurement, downlink channel state measurement, signal-to-noise ratio measurement or signal-to-interference-plus-noise ratio measurement, the smaller a measurement value is, the worse the measurement result is.

In a third aspect, an apparatus for selecting a user signature vector is provided, including: a processor; and a transceiver, connected to the processor and configured to receive and transmit data under control of the processor. The processor is configured to: acquire a measurement result of an actual channel state of a terminal; determine, based on the measurement result and a preset measurement threshold, a measurement result interval to which the measurement result belongs; determine, based on a preset correspondence between measurement result intervals and user signature vector sets, a candidate user signature vector set corresponding to the measurement result interval to which the measurement result belongs, where the candidate user signature vector set includes one or more user signature vectors; and select the user signature vector from the candidate user signature vector set.

In a fourth aspect, a non-volatile computer storage medium is provided, which stores thereon computer readable instructions executable by a processor. When executing the computer readable instructions, the processor performs following operations: acquiring a measurement result of an actual channel state of a terminal; determining, based on the measurement result and a preset measurement threshold, a measurement result interval to which the measurement result belongs; determining, based on a preset correspondence between measurement result intervals and user signature vector sets, a candidate user signature vector set corresponding to the measurement result interval to which the measurement result belongs, where the candidate user signature vector set includes one or more user signature vectors; and selecting a user signature vector from the candidate user signature vector set.

The above technical solutions have the following advantages or beneficial effects. The measurement result of the actual channel state of the terminal is acquired; the measurement result interval to which the measurement result belongs is determined based on the measurement result and the preset measurement threshold; the candidate user signature vector set corresponding to the measurement result interval to which the measurement result belongs is determined based on the preset correspondence between measurement result intervals and user signature vector sets, where the candidate user signature vector set includes one or more user signature vectors; and the user signature vector is selected from the candidate user signature vector set. In this way, the user signature vector is selected based on the measurement result of the actual channel state, which solves the issue in the related technology that a randomly selected user signature vector cannot match an actual channel state of a current terminal, and optimizes performance of non-orthogonal transmission.

DETAILED DESCRIPTION

Exemplary embodiments of the present disclosure are detailed in conjunction with drawings. It should be noted, the present disclosure may be implemented in various ways although the exemplary embodiments are illustrated in the drawings. The embodiments provided herein are not to limit the present disclosure, and on the contrary, they are provided for thoroughly understanding the present disclosure and completely conveying the scope of the present disclosure to those skilled in the art.

It is known by those skilled in the art that, the embodiments of the present disclosure may be implemented as a system, a device, an apparatus, a method or a computer program product. Hence, the embodiments of the present disclosure may be implemented in the followings ways: complete hardware, complete software (including firmware, resident software, microcode and so on), or combination of hardware and software.

Figure 1:
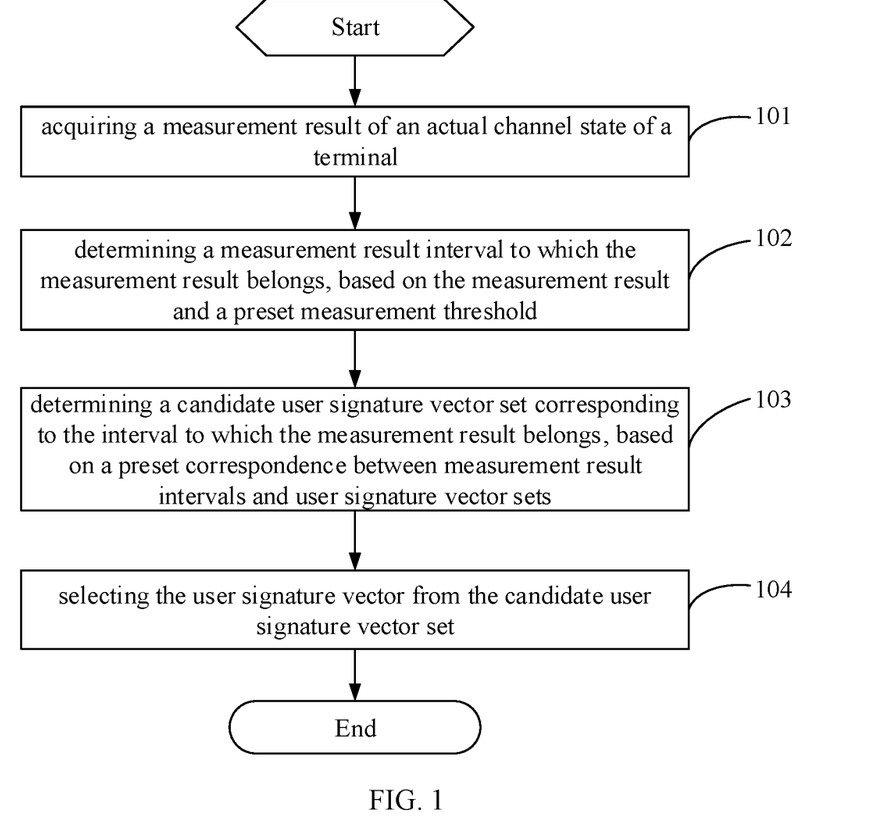
FIG. 1 is a flow chart of a method for selecting a user signature vector according to an embodiment of the present disclosure.

FIG. 1 illustrates a method for selecting a user signature vector, which includes steps 101 to 104.

Step 101 includes acquiring a measurement result of an actual channel state of a terminal, and then the method proceeds to step 103.

The measurement result is for reflecting the actual channel state of the current terminal. The measurement result may be acquired through, but not limited to, any of the following approaches: path loss measurement, downlink signal receiving power measurement, downlink signal receiving quality measurement, downlink channel state measurement, signal-to-noise ratio measurement or signal-to-interference-plus-noise ratio measurement.

In a case that the approach of path loss measurement is utilized, the greater a measurement value is, the worse the measurement result is. In a case that the approach of downlink signal receiving power measurement, downlink signal receiving quality measurement, downlink channel state measurement, signal-to-noise ratio measurement or signal-to-interference-plus-noise ratio measurement is utilized, the smaller a measurement value is, the worse the measurement result is.

Step 102 includes determining a measurement result interval to which the measurement result belongs, based on the measurement result and a preset measurement threshold, and then the method proceeds to step 103.

In an embodiment, M measurement thresholds are preset, where M≥0. For example, it is preset in a protocol that a network notifies two measurement thresholds, and three measurement result intervals may be obtained through partitioning based on the two measurement thresholds.

In the above example, one or both of the two measurement thresholds may be set empty. In a case that both measurement thresholds are empty, the measurement result interval to which the measurement result belongs can still be determined (e.g., corresponding to a whole measurement result interval). In a case that one measurement threshold is set empty, two intervals are obtained through partitioning based on the other measurement threshold, and then the measurement result interval to which the measurement result belongs is determined.

Step 103 includes determining a candidate user signature vector set corresponding to the measurement result interval to which the measurement result belongs based on a preset correspondence between measurement result intervals and user signature vector sets, and then the method proceeds to step 104. The candidate user signature vector set includes one or more user signature vectors.

Optionally, the preset correspondence between the measurement result intervals and the user signature vector sets may be, but not limited to, set in a protocol or notified by a network side.

The user signature vector may be generated through one or any combination of spreading, multidimensional constellation modulation, an interleaving pattern or a power distribution factor, while the generation is not limited thereto. For example, in PDMA, the user signature vector is a PDMA pattern or a column of a PDMA pattern array. In SCMA, the user signature vector is a SCMA codebook. In MUSA, the user signature vector is a complex valued spreading code.

For example, in PDMA, it is set in a protocol that the network side notifies two measurement thresholds, three measurement result intervals are obtained through partitioning based on the two measurement thresholds, subsets of a PDMA pattern set corresponding to the three measurement result intervals are respectively a PDMA pattern set having a diversity of 3, a PDMA pattern set having a diversity of 2 and a PDMA pattern set having a diversity of 1.

For example, in SCMA, the network side notifies M measurement thresholds, and M+1 intervals are obtained through partitioning for the measurement result based on the M measurement thresholds. In a case that M=2, the network side notifies two measurement thresholds: threshold1 and threshold2. If the measurement result of the terminal is smaller than or equal to threshold1, an SCMA codebook subset 1 notified by the network side is selected; if the measurement result of the terminal is greater than threshold1 and smaller than or equal to threshold2, an SCMA codebook subset 2 notified by the network side is selected; and if the measurement result of the terminal is greater than threshold2, an SCMA codebook subset 3 notified by the network side is selected.

For example, in MUSA, the network side notifies M measurement thresholds, and M+1 intervals are obtained through partitioning for the measurement result based on the M measurement thresholds. In a case that M=2, a system message notifies two measurement thresholds: threshold1 and threshold2, where threshold1<threshold2. It is notified in the system message that the quantity of spreading codes in a complex valued spreading code subset 1 is L1 and the quantity of spreading codes in a complex valued spreading code subset 2 is L2. The complex valued spreading codes included in the complex valued spreading code subset 1 are $\{c_0, c_1, \ldots, c_{L1-1}\}$, the complex valued spreading codes included in the complex valued spreading code subset 2 are $\{c_{L1}, c_{L1+1}, \ldots, c_{L1-L2-1}\}$, and complex valued spreading codes included in a complex valued spreading code subset 3 are $\{c_{L1+L2}, c_{L1+L2+1}, \ldots, c_N\}$.

Step 104 includes selecting the user signature vector from the candidate user signature vector set.

In a case that one user signature vector exists in the candidate user signature vector set, the user signature vector is selected.

In a case that there are multiple user signature vectors in the candidate user signature vector set, one user signature vector is selected randomly for each data flow, or the user signature vector is determined for each data flow based on a terminal identifier (ID) and a preset rule.

For example, the user signature vector may be determined from the candidate user signature vector set by performing a modulo operation on the terminal identifier (terminal ID) and the quantity of user signature vectors.

In the embodiments of the present disclosure, the measurement result of the actual channel state of the terminal is acquired, the measurement result interval to which the measurement result belongs is determined based on the measurement result and the preset measurement threshold, the candidate user signature vector set corresponding to the measurement result interval to which the measurement result belongs is determined based on the preset correspondence between the measurement result intervals and the user signature vector sets, and the user signature vector is selected from the candidate user signature vector set. Therefore, the user signature vector is selected based on the measurement result of the actual channel state, the technical problem in the related technology that a randomly selected user signature vector cannot match an actual channel state of a current terminal is solved, and performance of non-orthogonal transmission is optimized.

Figure 2:
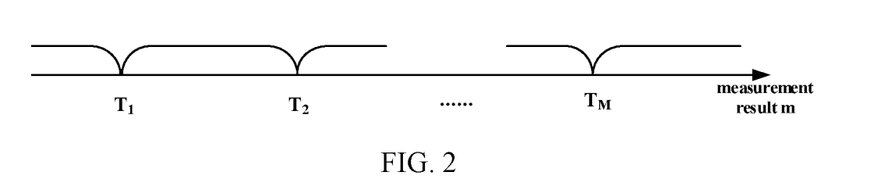
FIG. 2 is a schematic diagram of partitioning intervals based on measurement thresholds according to an embodiment of the present disclosure.

As shown in FIG. 2, the network side notifies M measurement thresholds (M≥0) through a system message, and M+1 intervals are obtained through partitioning for a measurement result m based on the M measurement thresholds. In FIG. 2, the M measurement thresholds are labeled as $T_1$, $T_2, \ldots, T_M$ in an ascending order of the measurement thresholds.

Specifically, the M+1 measurement result intervals respectively correspond to $\{m<T_1\}$, $\{T_1 \leq m<T_2\}, \ldots, \{m \geq T_M\}$. It should be noted that in a case that the measurement result equals to an i-th threshold (i=1, 2, ..., M), the measurement result may belong to an i-th measurement result interval or an (i+1)-th measurement result interval, which may be predetermined. For example, the M+1 measurement result intervals may be determined as $\{m \leq T_1\}$, $\{T_1<m \leq T_2\}, \ldots, \{m>T_M\}$.

The measurement may be path loss measurement, downlink signal receiving quality measurement, downlink channel state measurement, signal-to-noise ratio measurement (SNR), signal-to-interference-plus-noise ratio measurement (SINR) and so on.

It is detailed hereinafter based on Pattern Division Multiple Access (PDMA).

PDMA utilizes a low-density spreading with unequal diversities.

$$G^{[4,12]} = \begin{bmatrix} 1 & 0 & 1 & 1 & 1 & 0 & 0 & 0 & 1 & 0 & 0 & 0 \\ 0 & 1 & 1 & 0 & 0 & 1 & 1 & 0 & 0 & 1 & 0 & 0 \\ 1 & 1 & 0 & 1 & 0 & 1 & 0 & 1 & 0 & 0 & 1 & 0 \\ 1 & 1 & 0 & 0 & 1 & 0 & 1 & 1 & 0 & 0 & 0 & 1 \end{bmatrix}$$

Taking the above 4×12 PDMA pattern array for example, quantities of non-zero elements in different columns are not completely same, which correspond to different diversities D, where $1 \leq D \leq L$ and L is a length of a spreading code or the quantity of columns of the PDMA pattern array. A PDMA pattern set having a diversity of 1 includes $$\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\};$$

a PDMA pattern set having a diversity of 2 includes $$\left\{ \begin{bmatrix} 1 \\ 1 \\ 0 \\ 0 \end{bmatrix}, \begin{bmatrix} 1 \\ 0 \\ 1 \\ 0 \end{bmatrix}, \begin{bmatrix} 1 \\ 0 \\ 0 \\ 1 \end{bmatrix}, \begin{bmatrix} 0 \\ 1 \\ 1 \\ 0 \end{bmatrix}, \begin{bmatrix} 0 \\ 1 \\ 0 \\ 1 \end{bmatrix}, \begin{bmatrix} 0 \\ 0 \\ 1 \\ 1 \end{bmatrix} \right\};$$

and a PDMA pattern set having a diversity of 3 includes $$\left\{ \begin{bmatrix} 1 \\ 0 \\ 1 \\ 1 \end{bmatrix}, \begin{bmatrix} 0 \\ 1 \\ 1 \\ 1 \end{bmatrix} \right\}.$$

In PDMA, the user signature vector is a PDMA pattern/a column of the PDMA pattern array.

In an embodiment, a correspondence between measurement result intervals and user signature vector sets is determined in a protocol. That is, PDMA pattern subsets corresponding to different measurement result intervals are determined in the protocol. Specifically, it is determined in the protocol that three measurement result intervals obtained through partitioning based on two measurement thresholds notified by a network side respectively correspond to the PDMA pattern set having the diversity of 3, the PDMA pattern set having the diversity of 2 and the PDMA pattern set having the diversity of 1.

The network side notifies two measurement thresholds: threshold1 and threshold2, where threshold1<threshold2.

The terminal compares the measurement result with the thresholds notified by the network side to acquire a corresponding subset of a PDMA pattern set.

Specifically, for downlink signal receiving power measurement, downlink signal receiving quality measurement, downlink channel state measurement, signal-to-noise ratio measurement (SNR), or signal-to-interference-plus-noise ratio measurement (SINK), in a case that the measurement result of the terminal is smaller than or equal to threshold1, the PDMA pattern set having the diversity of 3 is selected; in a case that the measurement result of the terminal is larger than threshold1 and smaller than or equal to threshold2, the PDMA pattern set having the diversity of 2 is selected; and in a case that the measurement result of the terminal is larger than threshold2, the PDMA pattern set having the diversity of 1 is selected.

For path loss measurement, in a case that the measurement result of the terminal is smaller than or equal to threshold1, the PDMA pattern set having the diversity of 1 is selected; in a case that the measurement result of the terminal is larger than threshold1 and smaller than or equal to threshold2, the PDMA pattern set having the diversity of 2 is selected; and in a case that the measurement result of the terminal is larger than threshold2, the PDMA pattern set having the diversity of 3 is selected.

Optionally, in an embodiment, in a case that different user signature vectors have different diversities, a user signature vector having a high diversity corresponds to an interval for a poor measurement result. The correspondence between the measurement result intervals and the subsets of the PDMA pattern set determined in the protocol ensures that an interval for a relatively poor measurement result corresponds to a PDMA codebook having a relatively high diversity, such that a relatively high diversity is provided for a user with a relatively poor channel condition and PDMA reception performance is optimized. The diversity refers to the quantity of non-zero elements in a spreading sequence.

In addition, the network side may set one or both of the two measurement thresholds to be empty. In a case that both measurement thresholds are empty, the terminal may select the PDMA pattern sets corresponding to all diversities. In a case that one measurement threshold is empty, two intervals are obtained through partitioning for the measurement result based on the other measurement threshold, and the PDMA pattern set is partitioned into two subsets correspondingly. For example, for downlink signal receiving power measurement, downlink signal receiving quality measurement, downlink channel state measurement, signal-to-noise ratio measurement (SNR), or signal-to-interference-plus-noise ratio measurement (SINR), threshold1 is set empty, the PDMA pattern sets having the diversities of 3 and 2 are selected in a case that the measurement result of the terminal is smaller than or equal to threshold2, and the PDMA pattern set having the diversity of 1 is selected in a case that the measurement result of the terminal is larger than threshold2.

In the embodiment, the technical problem in related technology that a randomly selected user signature vector cannot match an actual channel state of a current terminal is solved and performance of non-orthogonal transmission is optimized.

The manner of notifying the M measurement thresholds by the network side and obtaining the M+1 intervals through partitioning for the measurement result based on the M measurement thresholds in the embodiment are identical to those according to the foregoing embodiments.

Figure 3:
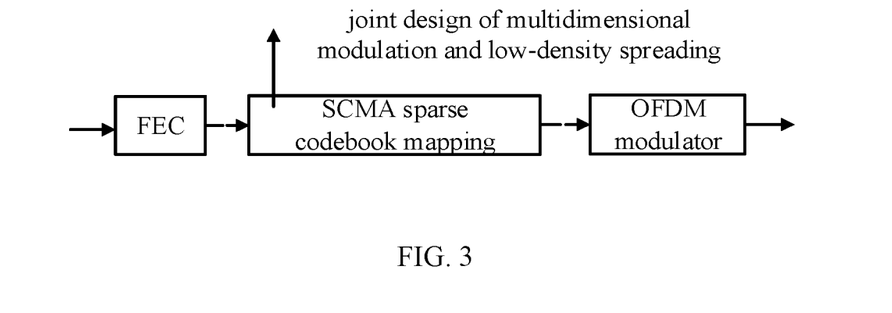
FIG. 3 is a schematic diagram of a system modal for SCMA according to an embodiment of the present disclosure.

It is detailed hereinafter based on Sparse Code Multiple Access (SCMA) with reference to FIG. 3.

A system model of SCMA is mapping a bit of a coded data flow directly to a codeword in a codebook formed by multidimensional constellation points.

Taking the following 4×6 SCMA codebook set for example (not considering SCMA modulation mapping), where each column is one SCMA codebook.

$$S = \begin{bmatrix} 1 & 0 & 1 & 0 & 1 & 0 \\ 0 & 1 & 1 & 0 & 0 & 1 \\ 1 & 0 & 0 & 1 & 0 & 1 \\ 0 & 1 & 0 & 1 & 1 & 0 \end{bmatrix}$$

In SCMA, the user signature vector is the SCMA codebook.

In a protocol, the SCMA codebook set is partitioned into N codebook subsets which are numbered as $S_0, S_1, \ldots, S_{N-1}$. Supposing N=6, an SCMA codebook subset Si predefined in the protocol corresponds to an i-th column of the SCMA codebook set. Supposing N equals to 3, SCAM codebook subsets $S_0, S_1, S_2$ predefined in the protocol each correspond to two columns of the 4×6 codebook as follows:

$$S'_0 = \left\{ \begin{bmatrix} 1 \\ 0 \\ 1 \\ 0 \end{bmatrix}, \begin{bmatrix} 0 \\ 1 \\ 0 \\ 1 \end{bmatrix} \right\}, S'_1 = \left\{ \begin{bmatrix} 1 \\ 1 \\ 0 \\ 0 \end{bmatrix}, \begin{bmatrix} 0 \\ 0 \\ 1 \\ 1 \end{bmatrix} \right\}, S'_2 = \left\{ \begin{bmatrix} 1 \\ 0 \\ 0 \\ 1 \end{bmatrix}, \begin{bmatrix} 0 \\ 1 \\ 1 \\ 0 \end{bmatrix} \right\}$$

In an embodiment, a correspondence between measurement result intervals and user signature vector sets is notified by the network side. Specifically, the network side notifies, via a system message, M measurement thresholds and SCMA codebook subsets corresponding to M+1 measurement result intervals, where $0 \leq M \leq N-1$. Specifically, the network side notifies numerical numbers of SCMA codebook subsets predefined in the protocol and included in the SCMA codebook subsets corresponding to the measurement result intervals.

For example, N equals to 6 and M equals to 2. The network side notifies two measurement thresholds threshold1 and threshold2. In addition, the network side notifies 3 corresponding SCMA codebook subsets, which are codebook subsets defined in the protocol: {S0,S1,S2}, {S3,S4}, {S5} respectively, i.e., $$\left\{ \begin{bmatrix} 1 & 0 & 1 \\ 0 & 1 & 1 \\ 1 & 0 & 0 \\ 0 & 1 & 0 \end{bmatrix} \right\}, \left\{ \begin{bmatrix} 1 & 0 & 1 \\ 0 & 1 & 1 \\ 1 & 0 & 0 \\ 0 & 1 & 0 \end{bmatrix} \right\}, \left\{ \begin{bmatrix} 1 & 0 & 1 \\ 0 & 1 & 1 \\ 1 & 0 & 0 \\ 0 & 1 & 0 \end{bmatrix} \right\}.$$

In another example, N equals to 3 and M equals to 1. The network side notifies one measurement threshold. In addition, the network side notifies two corresponding SCMA codebook subsets are codebook subsets defined in the protocol: $\{S'_0, S'_1\}$ and $\{S'_2\}$ respectively, i.e., $$\left\{ \begin{bmatrix} 1 & 0 & 1 & 0 \\ 0 & 1 & 1 & 0 \\ 1 & 0 & 0 & 1 \\ 0 & 1 & 0 & 1 \end{bmatrix} \right\} \text{ and } \left\{ \begin{bmatrix} 1 & 0 \\ 0 & 1 \\ 0 & 1 \\ 1 & 0 \end{bmatrix} \right\}.$$

The terminal compares the measurement result with the threshold(s) notified by the network side to acquire a corresponding SCMA codebook subset. Specifically, taking M=2 for example, in a case that the measurement result of the terminal is smaller than or equal to threshold1, an SCMA codebook subset 1 notified by the network side is selected; in a case that the measurement result of the terminal is larger than threshold1 and smaller than or equal to threshold2, an SCMA codebook subset 2 notified by the network side is selected; and in a case that the measurement result of the terminal is larger than threshold2, an SCMA codebook subset 3 notified by the network side is selected.

If the terminal needs to transmit only one data flow, in a case that the corresponding SCMA codebook subset merely includes one SCMA codebook, the terminal selects the SCMA codebook to perform data transmission; and in a case that the corresponding SCMA codebook subset includes multiple SCMA codebooks, the terminal selects one codebook from the multiple SCMA codebooks, randomly or according to a terminal identifier, to perform data transmission. Specifically, the SCMA codebook to be used may be selected from the SCMA codebook subset by performing a modulo operation on the terminal identifier (terminal ID) and the quantity of codebooks in the SCMA codebook subset.

If the terminal needs to transmit multiple data flows, and the corresponding SCMA codebook subset includes multiple SCMA codebooks, the terminal selects, for each data flow, one codebook from the multiple SCMA codebooks, randomly or according to a terminal identifier, to perform data transmission. If the corresponding SCMA codebook subset includes only one SCMA codebook, the terminal reselects an SCMA codebook set. Specifically, a codebook is selected for each data flow from the SCMA codebook subset including multiple SCMA codebooks.

The measurement may be path loss measurement, downlink signal receiving quality measurement, downlink channel state measurement, signal-to-noise ratio measurement (SNR), signal-to-interference-plus-noise ratio measurement (SINR) and so on.

In the embodiments, the technical problem in related technology that a randomly selected user signature vector cannot match an actual channel state of a current terminal is solved and performance of non-orthogonal transmission is optimized.

The manner of notifying the M measurement thresholds by the network side and obtaining the M+1 intervals through partitioning for the measurement result based on the M measurement thresholds in the embodiment are identical to those according to the foregoing embodiments.

Figure 4:
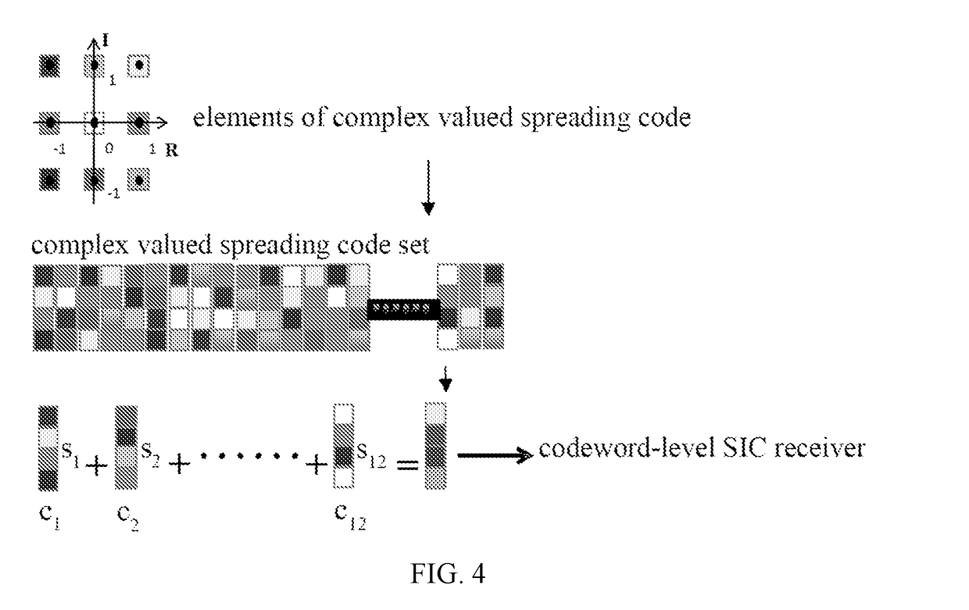
FIG. 4 is a schematic diagram of elements of a complex valued spreading code, a complex valued spreading code set and resource overlapping between users according to an embodiment of the present disclosure.

It is detailed hereinafter based on multi-user shared access (MUSA) with reference to FIG. 4.

MUSA has a basic feature that data is transmitted between terminals on identical resource through a non-orthogonal complex valued spreading code. FIG. 4 illustrates elements of a complex valued spreading code, a complex valued spreading code set and resource overlapping between users. In MUSA, a user signature vector is a complex valued spreading code.

In an embodiment, the network side notifies the correspondence between the measurement result intervals and the user signature vector sets. Specifically, all complex valued spreading codes are sorted, according to a preset rule, as $\{c_0, c_1, \ldots, c_N\}$, where ci ($0 \leq i \leq N$) represents an i-th spreading code in the complex valued spreading code set, and N is a total quantity of spreading codes in the complex valued spreading code set. By notifying quantities of spreading codes in M or M+1 complex valued spreading code subsets sequentially, the network side notifies complex valued spreading codes included in complex valued spreading code subsets corresponding to the measurement result intervals. In a case that the network side notifies the quantities of the spreading codes in M complex valued spreading code subsets, an (M+1)-th complex valued spreading code subset includes remained complex valued spreading code(s) in the set of all complex valued spreading codes $\{c_0, c_1, \ldots, c_N\}$ except the complex valued spreading codes included in the M complex valued spreading code sub sets.

For example, M equals to 2, and two thresholds, threshold1 and threshold2, are notified via a system message, where threshold1 is smaller than threshold2. It is notified via the system message that a quantity of spreading codes in a complex valued spreading code subset 1 is L1 and a quantity of spreading codes in a complex valued spreading code subset 2 is L2. Complex valued spreading codes included in the complex valued spreading code subset 1 are $\{c_0, c_1, \ldots, c_{L1-1}\}$, complex valued spreading codes included in the complex valued spreading code subset 2 are $\{c_{L1}, c_{L1+1}, \ldots, c_{L1+L2-1}\}$, and complex valued spreading codes included in a complex valued spreading code subset 3 are $\{c_{L1+L2}, c_{L1+L2+1}, \ldots, c_N\}$.

The terminal compares a measurement result with the thresholds notified by the network side to acquire a corresponding complex valued spreading code subset. Specifically, in a case that the measurement result of the terminal is smaller than or equal to threshold1, the complex valued spreading code subset 1 is selected; in a case that the measurement result of the terminal is larger than threshold1 and smaller than or equal to threshold2, the complex valued spreading code subset 2 is selected; and in a case that the measurement result of the terminal is larger than threshold2, the complex valued spreading code subset 3 is selected.

In a case that the corresponding complex valued spreading code subset includes only one complex valued spreading code, the terminal selects the complex valued spreading code to perform data transmission, and in a case that the corresponding complex valued spreading code subset includes multiple complex valued spreading codes, the terminal selects one complex valued spreading code randomly to perform data transmission.

It is noted that the embodiments are based on different non-orthogonal multiple access techniques and are intended to illustrate different user signature vectors under different non-orthogonal multiple access techniques. However, technical solutions in the present disclosure are not bound to the non-orthogonal multiple access techniques, and each technical solution can be extended to different non-orthogonal multiple access techniques.

In the embodiments, the technical problem in related technology that a randomly selected user signature vector cannot match an actual channel state of a current terminal is solved, and performance of non-orthogonal transmission is optimized.

Figure 5:
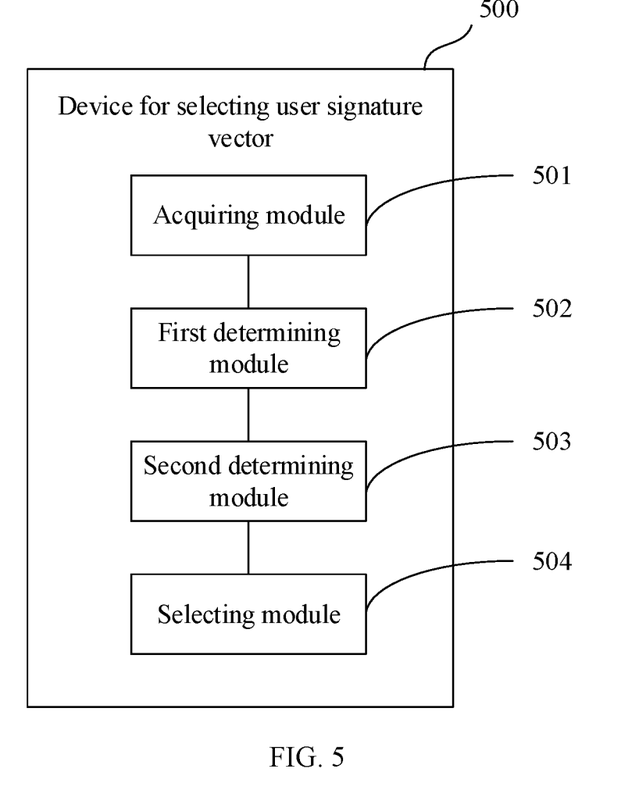
FIG. 5 is a block diagram of a device for selecting a user signature vector according to an embodiment of the present disclosure.

FIG. 5 illustrates a device for selecting a user signature vector. As shown in FIG. 5, the device 500 includes:

an acquiring module 501, configured to acquire a measurement result of an actual channel state of a terminal;

a first determining module 502, configured to determine a measurement result interval to which the measurement result belongs, based on the measurement result and a preset measurement threshold;

a second determining module 503, configured to determine a candidate user signature vector set corresponding to the measurement result interval to which the measurement result belongs, based on a preset correspondence between measurement result intervals and user signature vector sets, where the candidate user signature vector set includes one or more user signature vectors; and a selecting module 504, configured to select the user signature vector from the candidate user signature vector set.

Optionally, the device further includes a spreading module, which is configured to spread an information bit to one or more resources based on the selected user signature vector.

Optionally, the user signature vector may be generated through one or any combination of spreading, multidimensional constellation modulation, an interleaving pattern or a power distribution factor.

Optionally, the preset measurement threshold is notified by a network side.

Optionally, the preset correspondence between the measurement result intervals and the user signature vector sets is determined in a protocol or notified by the network side.

Optionally, in a case that different user signature vectors have different diversities, a user signature vector having a high diversity corresponds to an interval for a poor measurement result.

Optionally, the quantity of non-zero elements in a spreading sequence is defined as the diversity.

Optionally, the selecting module is further configured to select one user signature vector randomly for each data flow or determine the user signature vector for each data flow based on a terminal identifier (ID) and a preset rule, in a case that there are multiple user signature vectors in the candidate user signature vector set.

Optionally, the measurement result is acquired through any of path loss measurement, downlink signal receiving power measurement, downlink signal receiving quality measurement, downlink channel state measurement, signal-to-noise ratio measurement or signal-to-interference-plus-noise ratio measurement. In a case that the approach of path loss measurement is utilized, the greater a measurement value is, the worse the measurement result is. In a case that the approach of downlink signal receiving power measurement, downlink signal receiving quality measurement, downlink channel state measurement, signal-to-noise ratio measurement or signal-to-interference-plus-noise ratio measurement is utilized, the smaller a measurement value is, the worse the measurement result is.

In the embodiment, the technical problem in the related technology that a randomly selected user signature vector cannot match an actual channel state of a current terminal is solved, and performance of non-orthogonal transmission is optimized.

Figure 6:
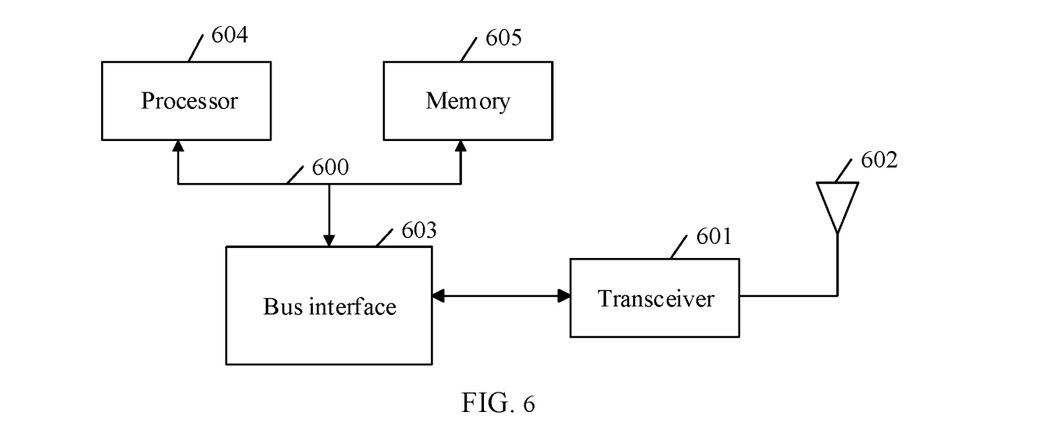
FIG. 6 is a block diagram of a device for selecting a user signature vector according to an embodiment of the present disclosure.

As shown in FIG. 6, an apparatus for selecting a user signature vector includes:

a processor 604, configured to read a program in a memory 605 to perform following operations: acquiring a measurement result of an actual channel state of a terminal; determining a measurement result interval to which the measurement result belongs, based on the measurement result and a preset measurement threshold; determining a candidate user signature vector set corresponding to the measurement result interval to which the measurement result belongs, based on a preset correspondence between measurement result intervals and user signature vector sets, where the candidate user signature vector set includes one or more user signature vectors; and selecting the user signature vector from the candidate user signature vector set; and a transceiver 601, configured to receive and transmit data under control of the processor 604.

In FIG. 6, a bus architecture (represented by a bus 600) may include an arbitrary quantity of buses and bridges connected to each other. Various circuits of one or more processors represented by the processor 604a memory represented by the memory 605 are coupled via the bus 600. The bus 600 may further couple other circuits together, such as a periphery component, a voltage stabilizer and a power management circuit, which is well known in the art and is not repeated herein. A bus interface 603 provides an interface between the bus 600 and the transceiver 601. The transceiver 601 may be one element, or may be multiple elements such as multiple receivers and multiple transmitters. The transceiver 601 provides a unit configured to communicate with other devices on a transmission medium. Data processed by the processor 604 is transmitted on a radio medium via an antenna 602. Furthermore, the antenna 602 receives data and transmits the received data to the processor 604.

The processor 604 is in charge of managing the bus 600 and common processes, and may further provide various functions, e.g., timing, periphery interfaces, voltage adjusting, power source management and other controlling functions. The memory 605 may be configured to store data to be used by the processor 604 when performing operations.

Optionally, the processor 604 may be a CPU, an ASIC, an FPGA or a CPLD.

Optionally, the processor 604 is further configured to spread an information bit to one or more resources based on the selected user signature vector.

Optionally, the user signature vector may be generated through one or any combination of spreading, multidimensional constellation modulation, an interleaving pattern or a power distribution factor.

Optionally, the preset measurement threshold is notified by a network side.

Optionally, the preset correspondence between the measurement result intervals and the user signature vector sets is determined in a protocol or notified by the network side.

Optionally, in a case that different user signature vectors have different diversities, a user signature vector having a high diversity corresponds to an interval for a poor measurement result.

Optionally, the quantity of non-zero elements in a spreading sequence is defined as the diversity.

Optionally, selecting the user signature vector from the candidate user signature vector set includes: selecting one user signature vector randomly for each data flow or determining the user signature vector for each data flow based on a terminal identifier (ID) and a preset rule, in a case that there are multiple user signature vectors in the candidate user signature vector set.

Optionally, the measurement result is acquired through any of path loss measurement, downlink signal receiving power measurement, downlink signal receiving quality measurement, downlink channel state measurement, signal-to-noise ratio measurement or signal-to-interference-plus-noise ratio measurement. In a case that the approach of path loss measurement is utilized, the greater a measurement value is, the worse the measurement result is. In a case that the approach of downlink signal receiving power measurement, downlink signal receiving quality measurement, downlink channel state measurement, signal-to-noise ratio measurement or signal-to-interference-plus-noise ratio measurement is utilized, the smaller a measurement value is, the worse the measurement result is.

In the embodiments, the technical problem in the related technology that a randomly selected user signature vector cannot match an actual channel state of a current terminal is solved, and performance of non-orthogonal transmission is optimized.

It should be understood that "one embodiment" or "an embodiment" mentioned throughout the specification means that specific features, structures or characteristics associated with the embodiment is included in at least one embodiment of the present disclosure. Hence, terms of "according to one embodiment" or "according to an embodiment" in the specification are not limited to the same embodiment. In addition, those specific features, structures or characteristics can be combined in one or more embodiments in any appropriate manner.

It should be understood, numerical references for respective processes in the embodiments of the present disclosure do not indicate any execution sequence, and these numerical references are not to limit implementation processes of the embodiments of the present disclosure. Execution sequences of the processes are determined based on functions and internal logics of the processes.

In addition, terms of "system" and "network" in the specification may be interchanged.

It should be understood, the term "and/or" merely describes a relationship between associated objects. Such term may indicate three situations. For example, A and/or B may indicate: mere A, both A and B, or mere B. Furthermore, the symbol "/" usually indicates an "or" relationship between associated objects prior to and after such symbol.

It should be understood that in the embodiments of the present disclosure, "B corresponding to B" indicates that B is associated with A and may be determined based on A. However, it should also be understood that determining B based on A does not mean determining B based on only A, and B may be determined based on A and/or other information.

It should be understood that the method and device provided in the embodiments of the present disclosure may be implemented in other ways. For example, the described embodiments directed to the device are merely exemplary. For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

Furthermore, functional units in the embodiments of the present disclosure may be integrated into one processing unit, or may be physically independent, or two or more units are integrated into one unit. The integrated units may be implemented by hardware or by combination of hardware and software.

Integrated units implemented as software functional units may be stored on a non-transitory computer readable storage medium. The software functional units are stored on a storage medium and include several instructions for enabling a computer device (which may be a personal computer, a server, a network apparatus or the like) to execute partial steps of methods according to embodiments of the present disclosure. The storage medium may include medium that can store program code, such as a USB flash disk, a mobile Hard Disk, a Read-Only Memory (ROM), a Random Access Memory (RAM), a magnetic disk or an optical disks.

Optional embodiments are described hereinabove. It should be noted that various improvements and polishments can be made by those ordinary skilled in the art without departing from the principle of the present disclosure. The improvements and polishments fall within the protection scope of the present disclosure.

What is claimed is:

1. A method for selecting a user signature vector, applied to a terminal, comprising:
   obtaining a measurement result of an actual channel state of the terminal;
   determining, based on the measurement result and a preset measurement threshold, a measurement result interval to which the measurement result belongs;
   determining, by the terminal, based on a preset correspondence between measurement result intervals and user signature vector sets, a candidate user signature vector set corresponding to the measurement result interval to which the measurement result belongs, wherein the candidate user signature vector set comprises one or more user signature vectors; and
   selecting the user signature vector from the candidate user signature vector set, wherein the user signature vector for grant-free non-orthogonal uplink transmission.

2. The method according to claim 1, further comprising: spreading an information bit to one or more resources based on the selected user signature vector.

3. The method according to claim 1, wherein the user signature vector is generated through one or any combination of spreading, multidimensional constellation modulation, an interleaving pattern or a power distribution factor.

4. The method according to claim 1, wherein the preset measurement threshold is notified by a network side.

5. The method according to claim 1, wherein the preset correspondence between the measurement result intervals and the user signature vector sets is determined in a protocol or notified by a network side.

6. The method according to claim 1, wherein in a case that different user signature vectors have different diversities, a user signature vector having a high diversity corresponds to an interval for a poor measurement result.

7. The method according to claim 6, wherein a quantity of non-zero elements in a spreading sequence is defined as the diversity.

8. The method according to claim 1, wherein selecting the user signature vector from the candidate user signature vector set comprises: selecting one user signature vector randomly for each data flow or determining the user signature vector for each data flow based on a terminal identifier (ID) and a preset rule, in a case that there is a plurality of user signature vectors in the candidate user signature vector set.

9. The method according to claim 1, wherein the measurement result is obtained through any of path loss measurement, downlink signal receiving power measurement, downlink signal receiving quality measurement, downlink channel state measurement, signal-to-noise ratio measurement or signal-to-interference-plus-noise ratio measurement;
   in a case of utilizing path loss measurement, the greater a measurement value is, the worse the measurement result is; and in a case of utilizing downlink signal receiving power measurement, downlink signal receiving quality measurement, downlink channel state measurement, signal-to-noise ratio measurement or signal-to-interference-plus-noise ratio measurement, the smaller a measurement value is, the worse the measurement result is.

10. The method according to claim 1, wherein: in pattern division multiple access (PDMA), the user signature vector is a PDMA pattern or a column of a PDMA pattern array; or, in sparse code multiple access (SCMA), the user signature vector is a SCMA codebook; or, in multi-user shared access (MUSA), the user signature vector is a complex valued spreading code.

11. A device for selecting a user signature vector, applied to a terminal, comprising:
   a processor; and
   a transceiver, connected to the processor and configured to receive and transmit data under control of the processor;
   wherein the processor is configured to:
   obtain a measurement result of an actual channel state of the terminal;
   determine, based on the measurement result and a preset measurement threshold, a measurement result interval to which the measurement result belongs;
   determine, based on a preset correspondence between measurement result intervals and user signature vector sets, a candidate user signature vector set corresponding to the measurement result interval to which the measurement result belongs, wherein the candidate user signature vector set comprises one or more user signature vectors; and
   select the user signature vector from the candidate user signature vector set, wherein the user signature vector is for grant-free non-orthogonal uplink transmission.

12. The device according to claim 11, wherein the processor is configured to spread an information bit to one or more resources based on the selected user signature vector.

13. The device according to claim 11, wherein the user signature vector is generated through one or any combination of spreading, multidimensional constellation modulation, an interleaving pattern or a power distribution factor.

14. The device according to claim 11, wherein the preset measurement threshold is notified by a network side.

15. The device according to claim 11, wherein the preset correspondence between the measurement result intervals and the user signature vector sets is determined in a protocol or notified by a network side.

16. The device according to claim 11, wherein in a case that different user signature vectors have different diversities, a user signature vector having a high diversity corresponds to an interval for a poor measurement result.

17. The device according to claim 16, wherein a quantity of non-zero elements in a spreading sequence is defined as the diversity.

18. The device according to claim 11, wherein the processor is configured to select one user signature vector randomly for each data flow or determine the user signature vector for each data flow based on a terminal identifier (ID) and a preset rule, in a case that there is a plurality of user signature vectors in the candidate user signature vector set.

19. The device according to claim 11, wherein the measurement result is obtained through any of path loss measurement, downlink signal receiving power measurement, downlink signal receiving quality measurement, downlink channel state measurement, signal-to-noise ratio measurement or signal-to-interference-plus-noise ratio measurement;

in a case of utilizing path loss measurement, the greater a measurement value is, the worse the measurement result is; and in a case of utilizing downlink signal receiving power measurement, downlink signal receiving quality measurement, downlink channel state measurement, signal-to-noise ratio measurement or signal-to-interference-plus-noise ratio measurement, the smaller a measurement value is, the worse the measurement result is.

20. A non-transitory, non-volatile computer storage medium, which stores thereon computer readable instructions executable by a processor, wherein when executing the computer readable instructions, the processor performs following operations:

obtaining a measurement result of an actual channel state of a terminal;

determining, based on the measurement result and a preset measurement threshold, a measurement result interval to which the measurement result belongs;

determining, based on a preset correspondence between measurement result intervals and user signature vector sets, a candidate user signature vector set corresponding to the measurement result interval to which the measurement result belongs, wherein the candidate user signature vector set comprises one or more user signature vectors; and selecting a user signature vector from the candidate user signature vector set, wherein the user signature vector is for grant-free non-orthogonal uplink transmission.

\* \* \* \* \*